June 10, 1924.

D. W. STROUP

APPARATUS FOR FORMING AXLES

Filed Nov. 10, 1921

1,497,040

6 Sheets-Sheet 1

June 10, 1924.

D. W. STROUP 1,497,040

APPARATUS FOR FORMING AXLES

Filed Nov. 10, 1921

6 Sheets-Sheet 3

WITNESSES
George B. Cramp.

INVENTOR.
Daniel W. Stroup.
By H. W. Stevenson.
Attorney

June 10, 1924.

D. W. STROUP

APPARATUS FOR FORMING AXLES

Filed Nov. 10, 1921

1,497,040

6 Sheets-Sheet 4

June 10, 1924.

D. W. STROUP 1,497,040

APPARATUS FOR FORMING AXLES

Filed Nov. 10, 1921     6 Sheets-Sheet 5

Patented June 10, 1924.

1,497,040

UNITED STATES PATENT OFFICE.

DANIEL W. STROUP, OF NORTH BRADDOCK, PENNSYLVANIA.

APPARATUS FOR FORMING AXLES.

Application filed November 10, 1921. Serial No. 514,267.

*To all whom it may concern:*

Be it known that I, DANIEL W. STROUP, a citizen of the United States, residing at North Braddock, in the county of Allegheny and State of Pennsylvania, have invented a certain new and useful Improvement in Apparatus for Forming Axles, of which the following is a specification.

This invention pertains to the art and manufacture of car axles, or other similar shaped articles, the primary object being to simplify the mill or apparatus requisite to forming a complete approximately finished product from a prepared blank or casting. My aim in this present invention is to provide an improvement over my former patents issued April 30th, 1912, Number 1,024,532, and Number 1,007,815 issued November 7th, 1911, wherein two sets of rotary presses or rolls are shown, namely roughing and finishing presses or rolls, by combining said two presses in one complete forming cam press or roll of special design and construction, thereby eliminating the roughing press or roll. The carrying out of this object will insure marked and practical economy in the manufacture of car axles and similar shaped articles, the work or process of formation being accomplished entirely by means of a single forming cam press or roll disclosed in the accompanying drawings. A further advantage accompanying this invention resides in the novel means and apparatus employed for inserting and withdrawing a mandrel from hollow axles, together with additional means for removing the finished axle from the mill.

Figure 1:
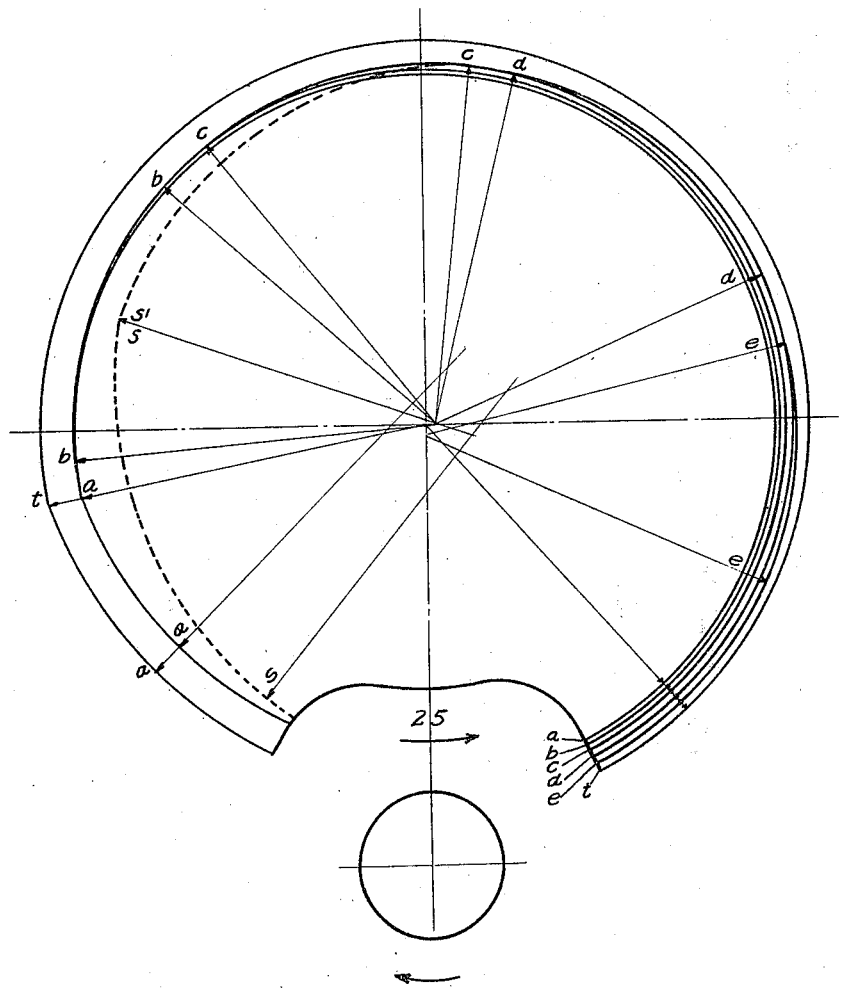
Figure 2:
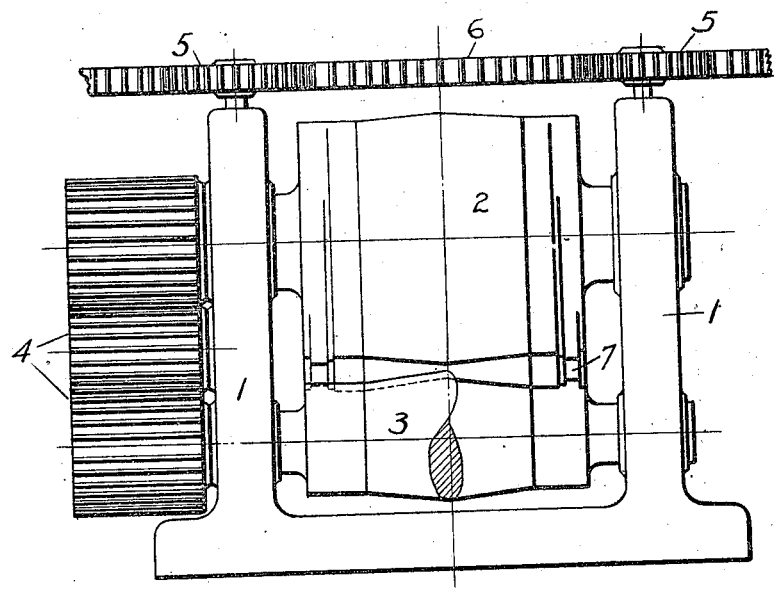
Figure 3:
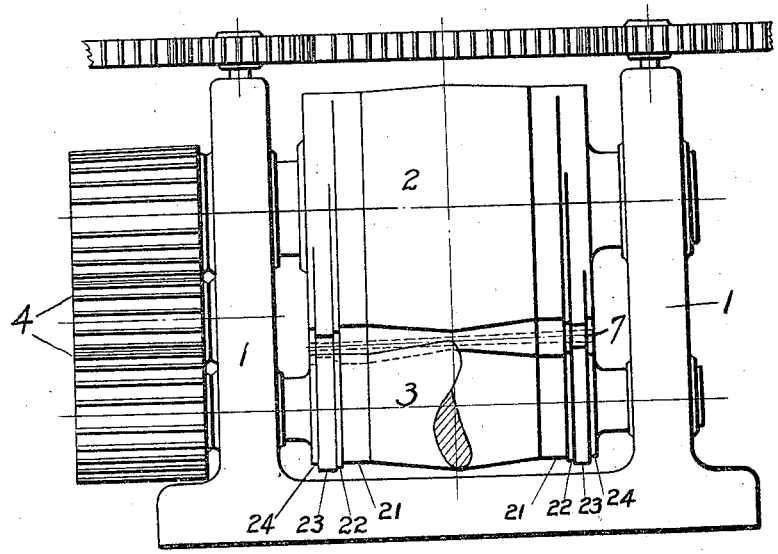
Figures 4, 5:
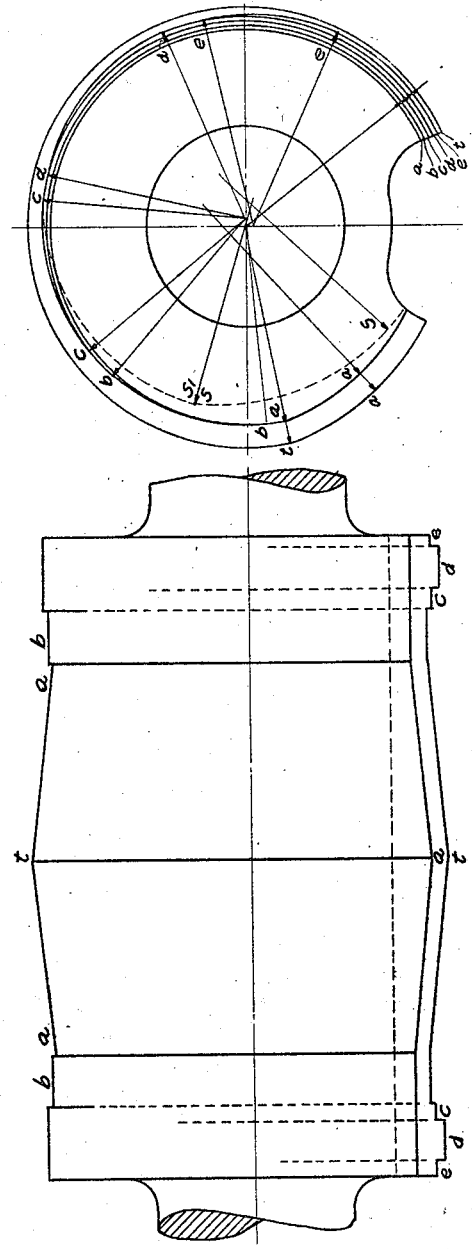
Figure 5:
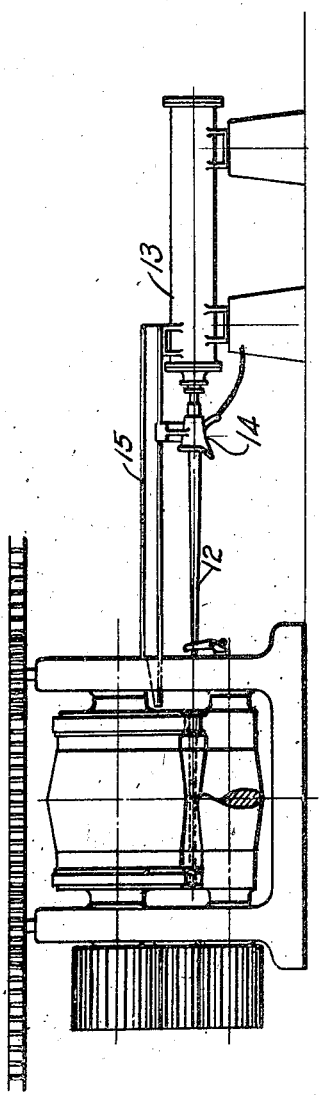
Figure 6:
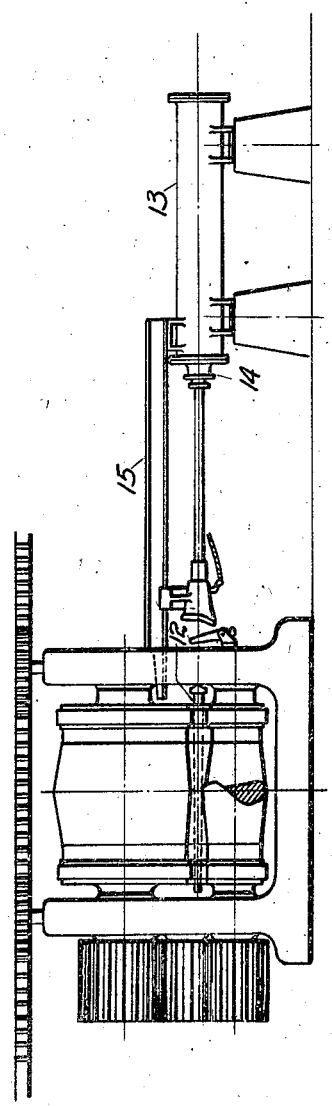
Figure 7:
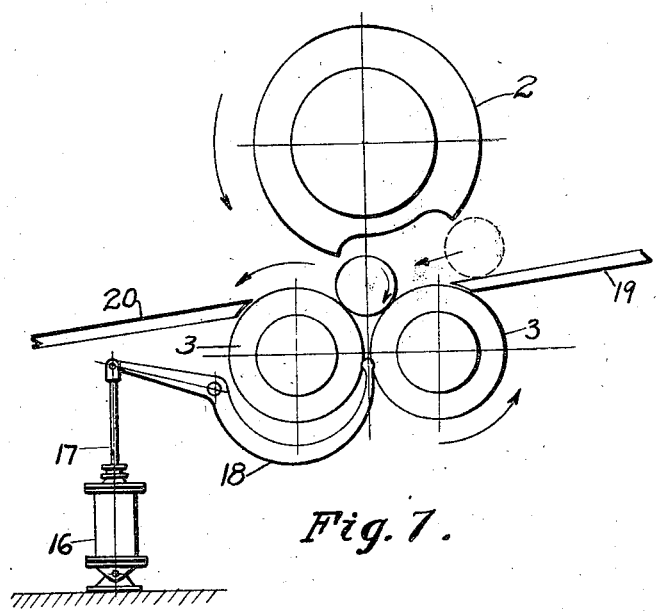
Figure 8:
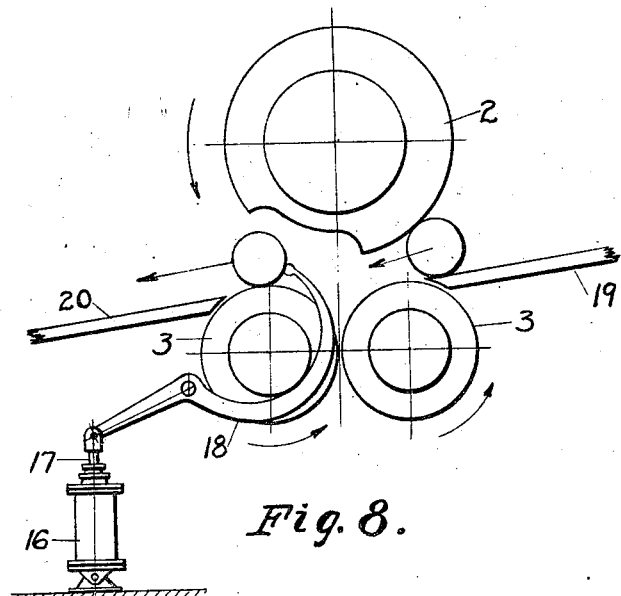
Figure 9:
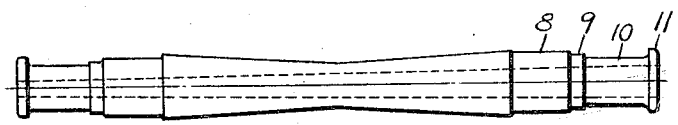
Figure 10:
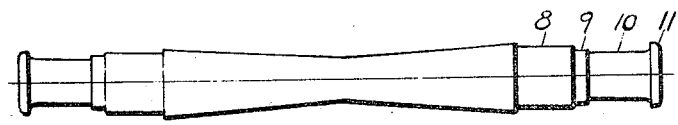
Figure 11:
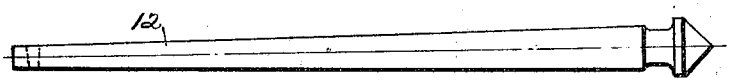

Referring to the drawings, Figure 1 is an end view of the forming cam press or roll, illustrating the different cut-out radii and the position of their respective centers; Figure 2 is a longitudinal side elevation of the housed forming cam press and cooperating lower driven forming rolls with the necessary intermediate operating gearing, showing a completed solid axle in position therein, while Figure 3 is a similar view with a completed hollow axle positioned therein; Figure 4 shows a longitudinal elevation of the detached forming cam press or roll; Figure 5 shows a housed forming cam press with a hollow axle seated therein, together with mechanism for introducing a mandrel into and out of the said hollow axle and Figure 6 is a similar view showing the mandrel inserted in the axle and released from the operating clutch mechanism; Figure 7 illustrates one mechanical means for entering the blank between the cam press and rolls and Figure 8 shows still another device for removing the finished axle, the relative variable positions of the forming cam press or roll being shown in both cases; Figure 9 shows a finished hollow axle; Figure 10, a finished solid axle; and Figure 11, a tapered mandrel.

Referring to the drawings, in which reference numerals and letters designate like parts throughout the different views, 1—1 are suitable housings in which the forming cam press or roll and lower forming rolls are mounted, 2 is the essential forming or cam press roll, 3—3 are lower disposed driven forming rolls or guides for holding the blank in position while being operated on by the press said blank being either solid or hollow, and furnishes the material to form the completed axle, and 4 is the operating gearing mechanism which rotates said forming rolls in contact with the blank, that their paths of revolution will be in the same direction as the path of the upper disposed press. As in my said former patent, Number 1,024,532, the two lower disposed forming rolls, 3—3, in this present invention, are formed similar to the upper disposed press 2, minus the eccentric features, but including thereon the necessary collars 21 to assist in forming the wheel bearings 8; collars 22 to assist in forming the dust guards 9; collars 23 to assist in forming the journal bearings 10; and with collars 24, to assist in forming the collars 11, as clearly shown in Figure 3, but I reserve the right to dispense with these aforesaid collar features, if found necessary after a further reduction to practice, as disclosed in Figure 2 of the drawings. Vertical adjustment of the press 2 is provided for in the screws 5—5 and cooperating meshing rack 6.

The said forming cam press or roll 2 is formed with double centrally disposed cut-out eccentric working portions $a$—$a$, that simultaneously work together, which eccentrics have different radii, as shown in Figures 1 and 5; their function being to give approximately a circumferentially uniform reduction to the blank 7 which blank furnishes the material while being operated on, the greatest diameter occurring at the longitudinal center of said press, tapering therefrom toward the ends. This press 2 is likewise provided with cut-out working eccentrics b—b, the eccentricity occurring consecutively with the said eccentrics a—a, which act upon the blank during the rotary movement of the press, immediately after the eccentric portions a—a cease to act, their function being to form the requisite wheel bearings 8—8 at both end sections of the blank. Immediately following the said eccentrics b—b, in substantially consecutive relationship, are the cut-out working eccentrics c—c for making the dust guard portions 9—9 on said blank, then immediately following are the cut-out working eccentrics d—d to provide the journal bearings 10—10 on the blank and finally, immediately following said eccentrics d—d, are other cut-out working eccentrics e—e, intended to form the collars 11—11 on said blank. Each of the aforesaid eccentric portions, for consecutively forming the designated sections of the finished axle, have their radial centers, as clearly indicated in Figure 1, and each eccentric is positioned on the press and so timed that a gradual elongation of the blank and formation of the various parts will occur with one complete revolution of the forming cam press or roll.

After the central reduction and elongation of the blank has taken place, incidental to the work of the eccentrics a—a, the middle tapered portion t, which is not a working part, acts to hold the blank firmly in position while being worked upon and further elongated by the eccentric working parts, thus preventing the metal from flowing back to the portion of the blank already completed.

In like manner, immediately following the successive formation of the wheel bearings, dust guards, journal bearings and collars, by means of the cut-out eccentric portions b, c, d, and e, and subsequent to each individual formation of the blank, the remaining peripheral surface of the press will have a true circle, taken from the axial center of said forming cam press or roll, which serves to further hold the blank in position during its gradual elongation until the last step in the process is reached which will be the collar forming eccentrics e—e, preventing the metal from flowing back into the parts previously completed by the different eccentric radii.

In order to insure that there will be no congestion of the material constituting the blank during said elongating process there is further provided on the press 2, a cut-out portion or clearance, indicated by the dotted line s, which is positioned preceding the journal and collar eccentric reductions or working parts d and e, in order that it does not leave a working part on the press while the wheel bearing and dust guard reductions are being made. I desire to lay particular stress on this aforesaid cut-out portion as being a vitally important feature on my improved axle forming cam press or roll, the functioning of this part avoiding any possibility of a jam or congestion of metal during the gradual elongation and consecutive formation of the respective portions of the axle. Said forming cam press roll is provided with a requisite recess 25, longitudinally thereof, at a point in the peripheral working surface between the eccentric working surfaces for entering or discharging the blank to and from said press.

In Figures 5 and 6, there is illustrated a mechanism for inserting and withdrawing a mandrel 12 from a hollow axle being formed by the forming cam press or roll, said mechanism consisting of a suitable horizontally mounted pressure cylinder 13, having a reciprocally actuated plunger carrying a suitable clutch or chuck 14 for releasably retaining said mandrel, together with a support or track 15 for guiding the mandrel into and out of the hollow axle. Figure 5 shows the relative position of the plunger and retained mandrel ready to enter said axle or subsequent to withdrawal therefrom, while Figure 6, shows the mandrel fully inserted into the axle and released from the clutch. Figure 7 illustrates a simple mechanism or table 19 for entering or introducing an axle blank to the forming cam press or roll, and Figure 8 shows a simple mechanical expedient for removing the finished axle from between the forming cam press and forming rolls consisting of a vertically positioned pressure cylinder 16, plunger 17, and fulcrumed, sickle-shaped expelling member 18, one end of which is pivotally connected to the said plunger element 17 with its free end permitted to move in an arc or path between the two lower disposed forming rolls, whereby when pressure is applied in the cylinder 16, the said member 18 will function intermediate of the lower driven forming rolls to force the completed axle on to a chute or run-way 20.

What I claim is:

1. A mill for forming car axles involving supports and comprising one rotary forming cam press or roll having upon its working part double centrally disposed cut-out eccentric portions, having different radii, that simultaneously work together, said central portion also being so shaped that the portion which is upon the part of the member which performs the last part of the pressing or rolling can remain in engagement with the blank without materially elongating and reducing the portions of said blank, said cam press being further provided with a plurality of eccentrically disposed reducing surfaces adjacent to the ends thereof, adapted to successively act upon the blank to form wheel bearings, dust guards, journal bearings and collars thereon.

2. A mill for forming car axles involving supports and comprising one forming cam roll or rotary press having upon its working part double centrally disposed cut-out eccentric portions, having different radii, that simultaneously work together, said portions also being so shaped that the portion which is upon the part of the member which performs the last part of the pressing or rolling can remain in engagement with the blank without materially elongating and reducing the portions of said blank, said press being further provided with a plurality of eccentrically disposed reducing surfaces adjacent the ends thereof, adapted to successively act upon the blank to form wheel bearings, dust guards, journal bearings and collars thereon, and a non-working cut-out portion or clearance positioned on said press preceding the journal and collar eccentric working parts.

Signed at Braddock in the county of Allegheny and State of Pennsylvania, this 4th day of November, 1921.

DANIEL W. STROUP.